Oct. 28, 1958 L. B. DARRAH 2,858,224
METHOD OF PROCESSING EGGS AND PRODUCT OBTAINED THEREBY
Filed April 26, 1956 2 Sheets-Sheet 1
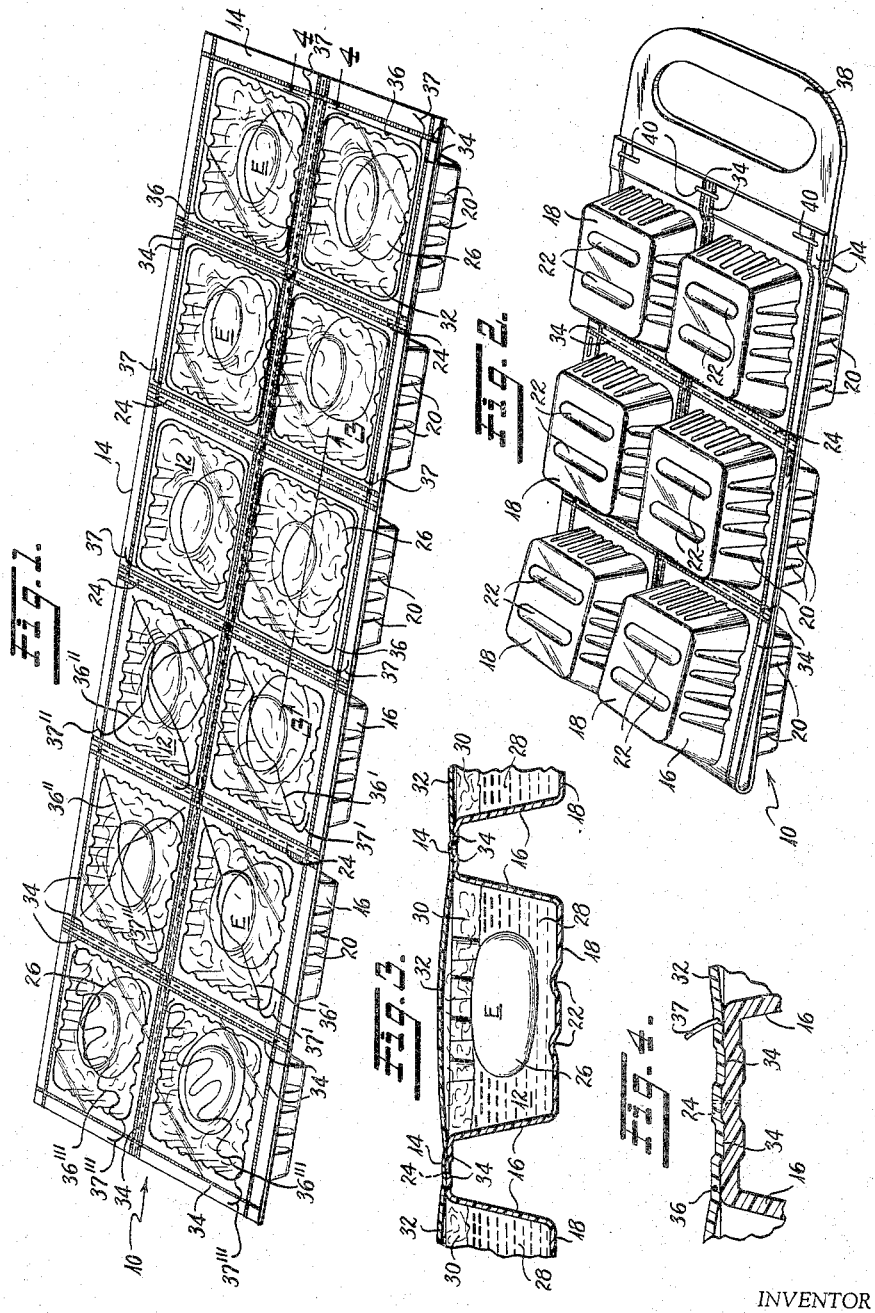
INVENTOR
Lawrence B. Darrah
BY
ATTORNEYS Oct. 28, 1958     L. B. DARRAH     2,858,224
METHOD OF PROCESSING EGGS AND PRODUCT OBTAINED THEREBY
Filed April 26, 1956     2 Sheets-Sheet 2

INVENTOR
Lawrence B. Darrah
BY
ATTORNEYS

United States Patent Office 2,858,224
Patented Oct. 28, 1958

2,858,224
METHOD OF PROCESSING EGGS AND PRODUCT OBTAINED THEREBY

Lawrence B. Darrah, Ithaca, N. Y., assignor to Cornell Research Foundation, Inc., Ithaca, N. Y., a corporation of New York Application April 26, 1956, Serial No. 580,839

8 Claims. (Cl. 99—161)

This invention relates to the process and apparatus for preparing eggs for market, especially eggs which have been previously marketed at greatly reduced prices or not marketed at all, at prices commensurate with prices of Grade A eggs.

It has long been necessary for the wholesaler and producer of eggs to market certain under-grade or ungraded eggs at a substantial loss or at a price substantially lower than the market price of Grade A eggs. Under-grade or ungraded eggs having defects such as being checked, cracked, misshapen, stained, mottled, thin-shelled or having abnormal air cells, minor internal defects, blood and meat spots, etc., are not marketed at the going price for Grade A eggs. The nutritional value of these eggs is the same as Grade A eggs. The causes for under-grading such eggs do not in any way affect the nutritional value of the eggs, but the consumer will not purchase such eggs at regular prices.

The present day practice of processing eggs for market necessitates a candling operation which is expensive, time-consuming, difficult and often inaccurate. Such candling operations attempt to identify and determine the interior quality of eggs in accordance with standards set up by the industry, but the candling operation often proves inadequate since the process relies upon human judgment, color of shell, yolk shadow, and many other factors. Further, off-odor eggs cannot be detected by candling. Frequently, in candling, eggs are classed as Grade B when they may actually be as good as other eggs classed as Grade A, if the two different classes of eggs were broken out of their shells, inspected, and the quality thereof precisely determined. Also, a certain number of Grade B eggs are not detected by candling and are marketed as Grade A causing dissatisfaction.

Furthermore, some eggs which may otherwise be of Grade A quality are not readily marketable, and bring lower prices because of the color of their shells.

Also, peewee sized eggs are more nourishing ounce for ounce than other sizes of eggs. However, such small eggs often sell for considerably less than 50 percent of the price of large eggs.

The normal variation in size of eggs may affect the use thereof in cooking recipes. The person preparing the recipe may have used eggs of one size, whereas the person following it later may use eggs of another size and may have unsatisfactory results therefrom.

Generally, an egg when laid is so constituted that it is naturally self-protected by the shell and the protective film (cuticle) which covers the shell from moisture, carbon dioxide loss, and micro-organism infection. In the handling and marketing procedures, these natural protective elements are partially or completely destroyed, thus permitting undue moisture and carbon dioxide loss which makes it possible for molds and bacteria to enter and infect the contents of a shell egg.

Attempts have been previously made to prepare shell-less eggs for market, as in the U. S. patent to Damuth 2,525,096, October 10, 1950, and the U. S. patent to Adams, 2,660,530, November 24, 1953. In the disclosure of these patents an egg is placed in an individual container and sealed therein with all of the air excluded therefrom. This method precludes the establishment of an equilibrium of the gases given off by the egg and the surrounding gases in the atmosphere.

These previous attempts have been made to package shell-less eggs in plastic containers by merely placing the shell-less egg in a container, completely evacuating all air from the container and then sealing the container so that the shell-less egg fully and completely occupies the total volume of the container. In all these processes the container used is one which has a very small amount of porosity, if any, so that the ability of the egg to give off the carbon dioxide and moisture is completely stopped or prohibited and such eggs in a short time develop an undesirable off-flavor.

In order to successfully eliminate the necessity for the candling step in the present day practice and process for marketing eggs, I remove the egg from its natural shell so the egg can be examined for any undesirable features. This provides the perfect examination of eggs for quality evaluations. The problem arises then as to how to market such shell-less eggs so that the eggs will have consumer appeal and further, so that the egg will maintain its original quality and be preserved for a greater length of time.

I have devised a method and means where an egg may be removed from its shell and packaged in a plastic container in an attractive manner with consumer appeal while retaining its flavor so that the particular egg can be marketable at a relatively high price in comparison to the price the particular egg would have brought under the marketing process now universally used.

An egg when it is first laid substantially fills the natural shell. Upon cooling from the body temperature the egg mass contracts and an area about the size of a dime is formed, which is an area intermediate the egg mass and the large end of the shell, such area providing an air sack. The egg is originally laid at a temperature of approximately 104 to 106 degrees F. and as the egg cools it contracts and the air sack or cell increases in size. During the period after an egg is laid it can be stated that such egg is alive and there takes place a transmissibility or exchange of gases with the egg giving up moisture and $CO_2$ and as the egg shell is highly porous, in giving up these gases the egg also takes on oxygen from the atmosphere. The air cell or sack is formed in the egg adjacent the large end thereof since the large end of the egg is more porous than the narrow end and the egg itself is wrapped in a membrane which adheres to the outer shell except where it is separated in forming the air cell. The porosity of the natural egg shell varies from the greatest porosity at the large end to the least porosity at the smaller end. The egg gives off $CO_2$ and moisture in all directions and the chemical analysis of the air in the air cell will show that the $CO_2$ content thereof increases rapidly for approximately three to four days at which time there is an equilibrium reached between the $CO_2$ and moisture given up by the egg and the air absorbed thereby through the porous shell. After the three or four day period has elapsed the amount of $CO_2$ given off by the egg fails off rapidly.

In order to store a shell-less egg so that the egg will retain its quality and flavor, it is necessary to keep micro-organisms and chemical activity at a minimum. In other words, the egg must be allowed to give off carbon dioxide and moisture, but at a slow rate. In order to successfully market a shell-less egg and to preserve quality and flavor, I use a substantially non-porous plastic container which is covered and closed by a like type or a laminated type flexible covering and filling the container with a shell-less egg so that there is a space intermediate the egg and the container which has carbon dioxide or other innocuous gases therein. In this process, there will be produced the desired results for marketing a high quality shell-less egg. The plastic container and covering by being substantially less porous than an egg shell will slow down the loss of carbon dioxide and moisture, and the space between the egg mass and container will permit enough transmissibility to maintain the flavor and quality of the egg.

By following my method of packaging and marketing eggs it is possible to standardize eggs at a maximum weight per dozen rather than to adjust eggs to a mean average in any given size class. By way of example, when the eggs are broken out of their shells, it is possible to separate eggs having minor internal defects, and to remove from such eggs any undesirable portion which may be unmarketable and leave available for marketing the desired portion which is not affected. It is then possible to take the recovered portion and add it to other eggs so that the resultant egg will be standardized at a given weight which is greater than the previous weight of the given egg.

Similarly, it is possible by this process to market only egg yolks or only egg whites—a highly desirable feature from a cooking standpoint.

In addition, it is possible to market heretofore low-grade low-priced peewee sized eggs as artificial double-yolk eggs at substantially higher prices by sealing a plurality of such eggs in shell-less form in a single container.

Under proper temperature conditions, eggs prepared according to my invention will retain their quality and flavor for long periods of time.

In connection with this process, one may use bacteriostats and fungistats to keep the egg material from microbiological infection. Antibiotics may be used or some of the recently available synthetic organic products such as propionic acid and ascorbic acid may be employed.

The primary object of this invention is to eliminate the present inadequate, expensive and inaccurate candling step in the process of marketing eggs.

A further object of this invention is to prepare eggs for marketing, which previously were marketed as undergrade eggs and therefore at prices substantially below those for Grade A eggs, at a higher price.

Another object of this invention is to prepare shell-less eggs for marketing by enclosing the whole shell-less egg mass in a non-deformable substantially non-porous plastic container.

A still further object of this invention is the provision of a container for shell-less eggs wherein the egg mass of each shell-less egg is in an individual compartment.

Yet another object of this invention is to provide means for marketing shell-less eggs wherein the eggs may be marketed singularly or in dozen or fractional dozen lots.

Another object of this invention is the provision of means for marketing shell-less eggs adapted for vending machines wherein one or more of such eggs may be equally easily dispensed.

A particular object of this invention is the provision of means to control the exudation of carbon dioxide and moisture from the egg and to prevent micro-organism infection by substituting a relatively non-porous plastic container for the egg shell which has had the normal protective elements removed or damaged.

An additional important object of this invention is the provision of means for marketing shell-less eggs where the consumer may see the product and judge the condition of the eggs by direct observation.

Still another object of this invention is the provision of a method and means for standardizing eggs for cooking purposes.

Another important object of this invention is the preparation of shell-less eggs for marketing in a plastic container wherein the eggs may be cooked without removal from the container.

An important object of this invention is the provision of a container for shell-less eggs having a gas pocket of a container for shell-less eggs having a gas pocket above the egg mass filled with a mixture of carbon dioxide or other innocuous gases.

Another important object of this invention is the provision of means for recovering previously unmarketable eggs and/or parts of previously unmarketable eggs and packaging the recovered eggs or portions thereof for marketing.

It is a particular object of this invention to prepare shell-less eggs for market by placing them in sealed containers, preferably a dozen to a container, wherein an individual egg may be removed for use without disturbing any other eggs.

Another particular object of this invention is the provision of a plastic container for shell-less eggs having a plurality of separate compartments and a single cover for each and all compartments.

Another object of this invention is the provision of a flexible cover to be sealed to a compartmented plastic container wherein that portion of the cover over a single compartment may be removed without disturbing the cover over any other compartment.

A further object of this invention is the provision of a package of eggs comprising a plastic carton having a plurality of shell-less eggs sealed therein in individual sealed pockets.

An additional object of this invention is the provision of a container for marketing shell-less eggs provided with pockets for individual eggs and a cover therefor in which the pockets are semi-rigid and the cover is flexible and yielding.

Another object of this invention is the provision of a plastic multi-pocket container for shell-less eggs and a cover therefor wherein the cover is provided with one or more rip cords whereby that portion thereof over any given pocket may be separately removed leaving the cover securely over the remaining pockets.

A further object of this invention is the provision of a method of packaging shell-less eggs in an atmosphere of an innocuous gas.

Another object of this invention is the provision of a method of packaging shell-less eggs with transparent covers so that eggs having interior blemishes as blood or meat spots, or yolk defects may be observed and eliminated without candling.

Another object of this invention is the detection and elimination of off-odor eggs.

Another object of this invention is the provision of a method of packaging shell-less eggs which permits the selection of eggs with uniform yolk color and size, which is not possible by candling.

Another object of this invention is the provision of a method of packaging shell-less eggs which permits the incorporation of bacteriostats and fungistats to keep the egg material from micro-biological infection.

Another object of this invention is the provision of a method of packaging shell-less eggs in pockets for individual eggs and a cover therefor in which the pockets are semi-rigid and the cover is of a laminated material which permits the cover to be easily pulled or torn from any particular given individual pocket of the container.

The above and other objects will be apparent from a consideration of the following specification taken with the accompanying drawings forming a part thereof. In the drawings, wherein like characters of reference indicate like parts throughout the several figures:

Fig. 1 is a perspective view of a package of eggs prepared according to this invention;

Fig. 2 is a perspective view of the package folded and with a carrying handle attached thereto;

Fig. 3 is a sectional view taken on the line 3—3 of Fig. 1;

Fig. 4 is a sectional view taken on the line 4—4 of Fig. 1;

Figure 5:
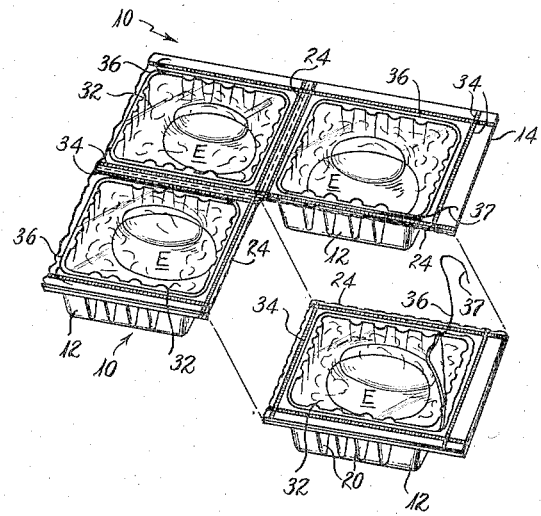
Fig. 5 is a partial perspective view showing a single section, containing an egg, removed from the package and opened.

Attention is now directed to Fig. 1 wherein there is illustrated a carton or package 10 of eggs E prepared according to the process of my invention. The carton 10 is divided into a plurality of individual sections, compartments or pockets 12. The pockets 12 have side, end and intermediate flanges 14, side walls 16 and bottom walls 18, and are formed of a semi-rigid material such as polyethylene sheet plastic. Indentations 20 are formed in the side walls 16 and similar indentations or grooves 22 are formed in the bottom walls 18 of the pockets 12 to increase the rigidity of the side and bottom walls, as is well known.

Where the intermediate flanges 14 of adjacent pockets 12 meet, the material thereof is weakened preferably by perforations or scorings 24, which facilitate separation of a given number of pockets, one or more than one, from the other pockets, whereby one or more pockets may be removed from the package without disturbing those desired to be left intact.

To prepare a carton or package according to this invention, eggs are opened and removed from the shells under sterile conditions and, after inspection and grading, are placed in the pockets 12. An egg E, note Fig. 3, comprises a yolk 26 and the white or albuminous portion 28. The yolk 26, being of a lower specific gravity than the white 28, floats to the top of the albumin, illustrated in Fig. 3. The relation of the size of the pocket 12 to the mass of the egg E is such that the egg does not completely fill the pocket. The space above the egg E is filled with an innocuous gas 30, such as carbon dioxide. A unitary flexible plastic cover 32, which may be formed of polyethylene sheet plastic, is placed over all of the several pockets 12 of the carton 10 and is sealed as at 34 to each pocket or compartment in the well known manner of electronic or heat sealing of such plastics. Between adjacent compartments or pockets the sealing means takes the form of an effective double seal suitably spaced on both sides of the weakened portions 24 in order to sever one compartment without disturbing any seals of other compartments. This seal may be formed by having two spaced lines 34, as illustrated in Fig. 4, with the weakened portion 24 intermediate the seal lines or a single seal line may be used which has a width equal to the combined widths of the two spaced seal lines and the weakened portion would then be made intermediate the longitudinal edges of the single seal to effectively provide a double seal between each compartment.

The cover 32 is much thinner than the side and bottom walls 16, 18, and is preferably somewhat more porous than the material of the pockets 12.

For the purpose of removing the cover from a single pocket there are provided a plurality of rip cords 36 which are suitably embedded in the cover sheets.

The rip cords may take other forms, as shown in Fig. 1 at 36', 36" and 36''', and each of the rip cords or tapes, have one end extending above the cover for convenient grasping, as shown at 37, 37', 37' and 37'''.

A single pocket 12 may be removed from the carton 10, as illustrated in Fig. 5, by severing or tearing the material along the line of the perforations or scorings 24. Fig. 5 also illustrates the removal of the cover 32 from the single pocket by use of the rip cord 36. A single compartment 12 containing an egg E may be removed with the cover intact, and the egg may be cooked without removal therefrom, in the manner of cooking an egg in its shell.

As illustrated in Fig. 2, the carton 10 may be prepared for convenient handling by folding it and bringing the ends together and attaching a handle 38 to the end flanges 14 by means of staples 40, or other suitable securing means, or the handle 38 can be made integral with the end flanges 14.

In connection with the packaging of the egg E in the pocket 12, mention was made of filling the space above the egg E with an innocuous gas 30. The gas 30 is harmless to the egg material and preferably comprises carbon dioxide ($CO_2$) or a mixture of gases which do not cause deterioration of the egg material. As carbon dioxide is heavier than air it is sufficient to fill the pockets or compartments 12 with eggs E and seal them therein in an atmosphere of this gas. No special apparatus is required to ensure the presence of the gas 30 in the space above and about the eggs E.

Figure 6:
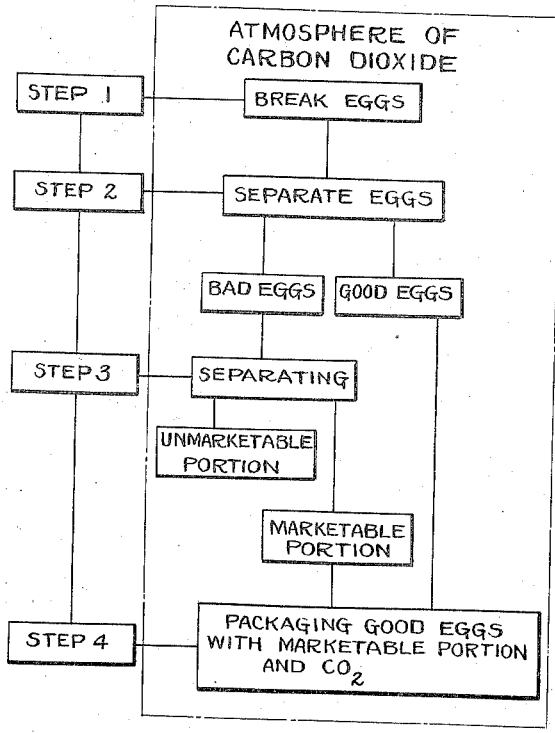
Fig. 6 is a flow diagram representing the steps of my process.

I shall now describe the steps of my process with reference to Fig. 6. In step 1, the shells of the eggs are broken and the contents are placed in suitable containers. Step 2 comprises separating the eggs into marketable eggs and eggs which are unmarketable under present day grading standards. Step 3 may involve the recovery of marketable portions by the separation of the marketable portions and the unmarketable portions of the unmarketable eggs. In step 4 the recovered marketable portions of the unmarketable eggs and the marketable eggs are suitably associated in the pockets 12 of the carton 10 according to a predetermined schedule of grading standards. This may involve the addition of recovered egg whites to the eggs previously routed to this step from step 2. The cover 32 is placed over the container and sealed in step 4. The steps just delineated are preferably carried out in an atmosphere of carbon dioxide, which may be provided by causing a stratum of this gas to flow over the work area. The space above the eggs E in the compartments 12 becomes filled with a mixture of $CO_2$, and the gas is sealed in the compartment when the cover 32 is applied and sealed to the carton 10. With such an atmosphere over or in the work area, entrance of harmful bacteria into the eggs is precluded. The presence of the gas in the space above the eggs E establishes a balanced condition which controls and establishes an equilibrium between the $CO_2$ and moisture given off by the egg and the absorption of gases, since the surrounding atmosphere is essentially $CO_2$.

The egg carton of this invention is a new article of commerce adapted for the ready marketing of shell-less eggs. The carton is also adapted for use in vending machines which may be set to dispense one or more eggs in their individual compartments.

While I have described a specific example of my novel egg package and the steps of my process, it is to be understood that such description is not a limitation and that departures may be made therefrom within the skill of the art and the scope of the appended claims.

I claim:

1. The method of processing an egg for market comprising the steps of removing the egg shell from the egg under sterile conditions and thereafter sealing the shell-less egg mass in a substantially impervious plastic container with said sealing step being conducted in an atmosphere consisting essentially of carbon dioxide gas so that a portion of such gas and the egg mass may occupy a space within the sealed container.

2. The product produced in accordance with the method of claim 1.

3. The method of processing eggs for market comprising the steps of removing the egg shell from each egg under sterile conditions and separating marketable egg mass from unmarketable egg mass, thereafter sealing a quantity of marketable egg mass in an individual substantially impervious plastic container with the sealing step being conducted in an atmosphere consisting essentially of carbon dioxide gas so that a portion of such gas and the quantity of marketable egg mass may occupy a space within the respective sealed container.

4. The method of processing eggs for market comprising the steps of removing the egg shell from each egg under sterile conditions and separating marketable egg mass from unmarketable egg mass, separating the unmarketable egg mass under sterile conditions into marketable egg parts and unmarketable egg parts, sealing said marketable egg mass and the marketable egg parts in a substantially impervious plastic container with the sealing step being conducted in an atmosphere consisting essentially of carbon dioxide gas so that a portion of such gas, the marketable egg mass and the marketable egg parts may occupy a space within the sealed container.

5. The method of preparing low-grade eggs for market comprising the steps of separating the eggs under sterile conditions into groups of low-grade eggs and high-grade eggs by removing the eggs of both groups from the respective egg shells, separating the low-grade eggs after inspection into marketable and unmarketable eggs, recovering the marketable eggs of the low-grade group and placing such recovered eggs into the high-grade group and thereafter sealing the recovered eggs of the low-grade group and the high-grade eggs into a substantially impervious plastic container with said sealing step being conducted in an atmosphere consisting essentially of carbon dioxide gas so that a portion of such gas, the recovered eggs of the low-grade group and the high-grade eggs may occupy a space within the sealed container.

6. The method of processing eggs for market comprising the steps of removing the egg shell from each egg under sterile conditions and separating the shell-less eggs into yolk mass and albumin mass, thereafter separately sealing the yolk mass and albumin mass in individual substantially impervious plastic containers with said sealing step being performed in an atmosphere consisting essentially of carbon dioxide gas so that a portion of such gas together with the respective yolk mass and albumin mass may occupy a space within the respective container.

7. A package of eggs comprising, a substantially impervious plastic container including a plurality of flanges defining a plurality of individual compartments, certain of said flanges of adjacent compartments being interconnected, said certain flanges having a weakened portion intermediate the adjacent compartments to enable removal of a given compartment therefrom and a common cover for all of the compartments secured to each of the flanges, a shell-less egg mass in each compartment, each of said egg masses being spaced from a portion of said container to define a space within the respective compartment, and a volume of carbon dioxide gas substantially filling the space within each compartment, said package being weakened along a laterally extending fold line intermediate the end portions thereof whereby said package may be longitudinally folded upon itself to facilitate the handling thereof.

8. The method of preparing eggs for market comprising the steps of removing the egg shell from each egg under sterile conditions and thereafter sealing a plurality of shell-less eggs in a single substantially impervious plastic container with said sealing step being conducted in an atmosphere consisting essentially of carbon dioxide gas so that a portion of such gas together with each of the shell-less eggs may occupy a space within the sealed container.

References Cited in the file of this patent

UNITED STATES PATENTS

| | | |
|---|---|---|
| 154,553 | Kuh | Sept. 1, 1874 |
| 1,994,468 | Freeman | Mar. 19, 1935 |
| 1,996,171 | Pennington et al. | Apr. 2, 1935 |
| 2,229,349 | Sigler | Jan. 21, 1941 |
| 2,384,462 | Goodman | Sept. 11, 1945 |
| 2,496,755 | Schwartzberg | Feb. 7, 1950 |
| 2,525,096 | Damuth | Oct. 10, 1950 |
| 2,550,189 | Droege et al. | Apr. 24, 1951 |
| 2,611,483 | Adams | Sept. 23, 1952 |
| 2,660,530 | Adams | Nov. 24, 1953 |
| 2,699,285 | Bell et al. | Jan. 11, 1955 |
| 2,736,656 | Marshall | Feb. 28, 1956 |
| 2,750,294 | Peters | June 12, 1956 |
| 2,756,155 | Hale et al. | July 24, 1956 |
| 2,760,714 | Rasmussen | Aug. 28, 1956 |

FOREIGN PATENTS

| | | |
|---|---|---|
| 16,362 of 1890 | Great Britain | Dec. 6, 1890 |

OTHER REFERENCES

"Chemical and Engineering News" November 28, 1955, page 5226, article entitled "Cheaper by the Dozen."